(12) United States Patent
Choi et al.

(10) Patent No.: US 10,602,311 B2
(45) Date of Patent: *Mar. 24, 2020

(54) APPARATUS AND METHOD FOR ESTIMATING LOCATION IN A WIRELESS COMMUNICATION SYSTEM

(71) Applicant: Samsung Electronics Co., Ltd., Gyeonggi-do (KR)

(72) Inventors: Seung-Won Choi, Gyeonggi-do (KR); Seong-Wook Song, Seoul (KR); Jong-Han Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,299

(22) Filed: May 10, 2019

(65) Prior Publication Data

US 2019/0268718 A1    Aug. 29, 2019

Related U.S. Application Data (63) Continuation of application No. 15/153,440, filed on May 12, 2016, now Pat. No. 10,292,009.

(30) Foreign Application Priority Data

May 12, 2015 (KR) .................. 10-2015-0066262
Oct. 23, 2015 (KR) .................. 10-2015-0148338

(51) Int. Cl.
*H04W 24/00* (2009.01)
*H04W 4/02* (2018.01)

(52) U.S. Cl.
CPC .......... *H04W 4/023* (2013.01); *H04W 4/027* (2013.01)

(58) Field of Classification Search
USPC ............................ 455/456.1, 456.2; 701/465
See application file for complete search history.

(56) References Cited

U.S. PATENT DOCUMENTS

2006/0251181 A1    11/2006 Shashidhar
2011/0287779 A1*   11/2011 Harper .................. G01S 19/03
                                                    455/456.1

(Continued)

FOREIGN PATENT DOCUMENTS

CN    101563625        10/2009
CN    102461291        5/2012
WO    WO-2016205980 A1 * 12/2016 ............ H04W 4/029

OTHER PUBLICATIONS

Chinese Office Action dated Nov. 22, 2019 issued in counterpart application No. 201610319025.7, 12 pages.

*Primary Examiner* — David Q Nguyen
(74) *Attorney, Agent, or Firm* — The Farrell Law Firm, P.C.

(57) ABSTRACT

Disclosed is a method for increasing location estimation accuracy of a communication device, including identifying a set including at least one sample among a plurality of samples of a probability distribution for estimated locations of the communication device, and determining a location of the communication device among the at least one sample based on a reliability of each of the at least one sample, by determining the reliability of each of the at least one sample in the set, when a difference between a first location of the communication device which is estimated based on a first scheme and a second location of the communication device which is estimated based on a second scheme is greater than or equal to a preset threshold value, and determining a sample of which a reliability is greatest among the at least one sample as the location of the communication device.

20 Claims, 6 Drawing Sheets

(56) References Cited

U.S. PATENT DOCUMENTS

| | | |
|---|---|---|
| 2012/0042726 A1 | 2/2012 | Jeon |
| 2013/0053056 A1* | 2/2013 | Aggarwal ............. G01S 5/0263 |
| | | 455/456.1 |
| 2013/0267244 A1 | 10/2013 | Palanki et al. |
| 2014/0139663 A1 | 5/2014 | Watanabe |
| 2014/0162697 A1 | 6/2014 | Cudalbu |
| 2014/0228045 A1 | 8/2014 | Belmonte |
| 2015/0061938 A1 | 3/2015 | Moreleda et al. |
| 2015/0071090 A1 | 3/2015 | Mohammed |
| 2015/0073702 A1* | 3/2015 | Jouaux ................ G06Q 10/047 |
| | | 701/465 |
| 2015/0223145 A1 | 8/2015 | Yoon |
| 2015/0341233 A1 | 11/2015 | Marri Sridhar |
| 2016/0088438 A1 | 3/2016 | O'Keeffe |
| 2016/0088584 A1* | 3/2016 | Kudekar ............ H04W 64/003 |
| | | 455/456.2 |
| 2016/0117688 A1* | 4/2016 | Ghosh ................ G06Q 30/0201 |
| | | 705/7.29 |
| 2017/0048674 A1 | 2/2017 | Fix |
| 2017/0055126 A1 | 2/2017 | O'Keeffe |
| 2017/0078851 A1 | 3/2017 | Agrawal |
| 2019/0066042 A1* | 2/2019 | Conlon .............. H04L 63/1466 |

* cited by examiner

APPARATUS AND METHOD FOR ESTIMATING LOCATION IN A WIRELESS COMMUNICATION SYSTEM

PRIORITY

This application is a Continuation Application of U.S. patent application Ser. No. 15/153,440, filed on May 12, 2016, and claims priority under 35 U.S.C. § 119(a) to Korean Patent Applications filed on May 12, 2015 and Oct. 23, 2015 in the Korean Intellectual Property Office and assigned Serial Nos. 10-2015-0066262 and 10-2015-0148338, respectively, the content of each of which is incorporated herein by reference.

BACKGROUND

1. Field of the Disclosure

The present disclosure relates generally to an apparatus and method for estimating a device's location in an interior location/environment, and more particularly, to an apparatus and method which increases the accuracy of location estimation in a wireless communication system.

2. Description of the Related Art

Recently, location based services (LBSs) have been actively studied for use in mobile terminals, e.g., smart phones. The typical scheme for estimating a location of a mobile terminal uses a global navigational satellite system (GNSS), such as the global positioning system (GPS). However, the received signal strength of a GPS satellite signal can be very weak, and the mobile terminal may not be able to detect its own location accurately.

In environments where the GPS satellite signal is weak and/or scrambled, such as in an interior environment, schemes for measuring a location of a mobile terminal using a short-range wireless communication systems such as radio frequency identification (RFID), BLUETOOTH™, wireless local area network (WLAN), and the like have been actively studied.

Among the short-range communication schemes, WLAN has an extensively built infrastructure and support base, and is one of the most widely used wireless systems in interior locations. Accordingly, WLAN could be a scheme for estimating a location of a mobile terminal in an interior environment.

Interior location estimating schemes using WLAN may be classified as either non-parametric or parametric, as will be described below.

The non-parametric approach scheme does not use parameters which may specify a system. A typical non-parametric approach is the fingerprint scheme. In the fingerprint scheme, a mobile terminal previously measures and stores a received signal strength indicator (RSSI) or a round trip time (RTT) value at each of a plurality of points of a signal received from a wireless access point (AP). The mobile terminal estimates a grid point which is most similar to strength of a received signal which is actually received as a location of the mobile terminal. The plurality of points may be generated by dividing an interior map on a grid basis or according to a preset rule.

The parametric approach scheme uses parameters to estimate the location of the mobile terminal. A typical parametric approach is to use a path loss model.

Both the parametric and non-parametric interior location estimating schemes require a training phase.

The training phase denotes a phase whereby a mobile terminal divides an area at which the mobile terminal intends to provide an LBS on a grid basis, and stores an average measurement value of an RSSI or RTT of a received signal received from an AP adjacent to each of grid points at each of the grid points at a database.

The (non-parametric) fingerprint interior location estimating scheme has a higher accuracy than any parametric approach scheme, so the fingerprint interior locating estimation scheme is used more than any based on the parametric approach.

However, in the fingerprint-based interior location estimating scheme, a server needs to generate a database for all possible grid points on a map, so the training phase requires much manpower and time, and the server needs to transmit information on received signals received from all APs adjacent to each grid point at each grid point to a mobile terminal, so the amount of data which is transmitted from the server to the mobile terminal is quite large.

By contrast, parametric interior location estimating schemes do not have the same problems with extensive data resource usage that can occur using the fingerprint-based non-parametric scheme. However, as stated above, parametric interior location estimating schemes have a lower accuracy than the fingerprint-based non-parametric scheme, so parametric interior location estimating schemes are not as actively studied.

SUMMARY

Aspects of the present disclosure address at least the above-mentioned problems and/or disadvantages and to provide at least the advantages described below.

Accordingly, an aspect of the present disclosure is to propose an apparatus and method for estimating a location in a wireless communication system. Another aspect of the present disclosure is to propose an apparatus and method for increasing accuracy in location estimation in a wireless communication system.

Another aspect of the present disclosure is to propose an apparatus and method for increasing accuracy of estimating a location of a mobile terminal by selecting a plurality of candidate locations of the mobile terminal based on a reliability test if there are the plurality of candidate locations in a wireless communication system.

Another aspect of the present disclosure is to propose an apparatus and method for increasing accuracy of estimating a location of a mobile terminal by restricting a movable distance from a previous location of the mobile terminal in a wireless communication system.

Another aspect of the present disclosure is to propose an apparatus and method for estimating a location based on sensor information in a preset period in a wireless communication system.

Another aspect of the present disclosure is to propose an apparatus and method for estimating a location thereby increasing accuracy in location estimation in a wireless communication system.

Another aspect of the present disclosure is to propose an apparatus and method for estimating a location thereby decreasing complexity in a wireless communication system.

Another aspect of the present disclosure is to propose an apparatus and method for estimating a location thereby enhancing reliability in a wireless communication system.

Another aspect of the present disclosure is to propose an apparatus and method for estimating a location thereby decreasing time required for estimating the location in a wireless communication system.

In one aspect of the present disclosure, a method for increasing location estimation accuracy of a communication device includes identifying a set including at least one sample among a plurality of samples of a probability distribution for estimated locations of the communication device, and determining a location of the communication device among the at least one sample based on a reliability of each of the at least one sample, wherein the determining comprises, when a difference between a first location of the communication device which is estimated based on a first scheme and a second location of the communication device which is estimated based on a second scheme is greater than or equal to a preset threshold value, determining the reliability of each of the at least one sample in the set, and determining a sample of which a reliability is greatest among the at least one sample as the location of the communication device.

In another aspect of the present disclosure, a communication device for increasing location estimation accuracy of the communication device includes at least one processor configured to identify a set including at least one sample among a plurality of samples of a probability distribution for estimated locations of the communication device, and determine a location of the communication device among the at least one sample based on a reliability of each of the at least one sample, wherein determining the location comprises, when a difference between a first location of the communication device which is estimated based on a first scheme and a second location of the communication device which is estimated based on a second scheme is greater than or equal to a preset threshold value, determine the reliability of each of the at least one sample in the set, and determine a sample of which a reliability is greatest among the at least one sample as the location of the communication device.

In another aspect of the present disclosure, there is disclosed a non-transitory computer-readable medium, wherein at least one processor, when executing instructions stored on the non-transitory computer-readable medium, performs a method comprising identifying a set including at least one sample among a plurality of samples of a probability distribution for estimated locations of the communication device, and determining a location of the communication device among the at least one sample based on a reliability of each of the at least one sample, wherein the determining comprises, when a difference between a first location of the communication device which is estimated based on a first scheme and a second location of the communication device which is estimated based on a second scheme is greater than or equal to a preset threshold value, determining the reliability of each of the at least one sample in the set, and determining a sample of which a reliability is greatest among the at least one sample as the location of the communication device

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

The following description is provided with reference to the accompanying drawings to assist in a comprehensive understanding of various embodiments of the present disclosure; however, the present disclosure itself is only defined by the appended claims and their equivalents. Accordingly, the following description includes various specific details to assist in that understanding but these are to be regarded as mere non-limiting examples. Those of ordinary skill in the art will recognize that various changes and modifications of the various embodiments described herein can be made without departing from the scope and spirit of the present disclosure. Descriptions of well-known functions, components, and apparatuses may be omitted herein for clarity and conciseness.

The terms and words used in the following description and claims are not necessarily limited to their dictionary meanings. The terms and words used herein are merely used for illustration purposes only and not for the purpose of limiting the present disclosure as defined by the appended claims and their equivalents.

It is to be understood that the singular forms "a," "an," and "the" include their plural forms unless the context clearly dictates otherwise. Thus, for example, reference to "a component surface" includes reference to one or more of such surfaces.

Although ordinal numbers such as "first," "second," and so forth may be used to describe various components, those components are not limited by use of such terminology herein. The terms are used only for distinguishing one component from another component. For example, a first component may be referred to as a second component and likewise, a second component may also be referred to as a first component, without departing from the teachings of the present disclosure. The term "and/or" as used herein includes any and all combinations of one or more of the listed items.

The terms "comprises" and "has," when used in this specification, specify the presence of the listed features, numbers, steps, operations, components, elements, or any combination thereof, but do not preclude the addition of one or more other features, numbers, steps, operations, components, elements, or combinations thereof.

The terms used herein, including technical and scientific terms, have the same meanings as terms that are generally understood by those of ordinary skill in the art, as long as the terms are not clearly differently defined/used in context.

According to various embodiments of the present disclosure, an electronic device may include communication functionality. For example, an electronic device may be a mobile terminal, a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, an electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Embodiments of the present disclosure include apparatuses, systems, and methods for estimating a location in an interior environment, including apparatuses and methods for increasing the accuracy of location estimation in an interior environment by a mobile terminal in a wireless communication system. In one aspect, the accuracy of estimating a location of a mobile terminal is increased by selecting a plurality of candidate locations of the mobile terminal based on a reliability test. In another aspect, the accuracy of estimating a location of a mobile terminal is increased by restricting a movable distance from a previous location of the mobile terminal. In some embodiments of the present disclosure, an apparatus and method are provided for estimating a location based on sensor information in a wireless communication system.

According to various aspects of the apparatuses, systems, and methods according to various embodiments of the present disclosure, the accuracy of location estimation in an interior environment may be increased, the complexity of location estimation in an interior environment may be decreased, the reliability of location estimation in an interior environment may be enhanced, and the time required for estimating the location of a mobile terminal of a wireless communication system in an interior environment may be decreased.

According to various embodiments of the present disclosure, methods, apparatuses, and systems may be applied to various communication systems, such as, but not limited to, a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ Generation Project Partnership 2 (3GPP2), a wideband code division multiple access (WCDMA) mobile communication system proposed in the 3GPP2, a code division multiple access (CDMA) mobile communication system proposed in the 3GPP2, an Institute of Electrical and Electronics Engineers (IEEE) 802.16m communication system, an IEEE 802.16e communication system, an evolved packet system (EPS), and a mobile internet protocol (Mobile IP) system and/or the like.

An interior location estimating scheme for a wireless communication device according to embodiments of the present disclosure include a training phase and an interior location estimating phase, which includes a coarse phase and a refinement phase.

The training phase estimates the location of the mobile terminal at a specific time, e.g., a wireless fidelity (Wi-Fi) scan time. Further, in the training phase, in each of points included in an area in which a location based service (LBS) is provided, an average estimated value of a received signal strength indicator (RSSI) or round trip time (RTT) received from an access point (AP) which is neighbor to each of the points is stored in a database. Here, the points may be generated by dividing the area in which the LBS is provided on a grid basis, or based on a preset rule. The points may be generated in various forms as well as the forms as described above, and a detailed description will be omitted herein. An AP can also be considered a reference signal transmitting apparatus which transmits a reference signal which is used in the inner location estimating scheme, and the reference signal may be one of various signals.

The coarse phase of the interior location estimating phase increases the accuracy of estimating the location of the mobile terminal by selecting one of a plurality of candidate locations for the mobile terminal based on a reliability test (if there are a plurality of candidate locations). The refinement phase increases the location estimation accuracy by restricting a movable distance from a previous location of the mobile terminal based on sensor information.

A scheme for decreasing the complexity of the training phase according to an embodiment of the present disclosure is described below.

In this embodiment of the present disclosure, the RSSI is stored in a database during the training phase. However, various alternative and/or additional received signal strength parameters may be stored, such as received signal code power (RSCP), reference signal received power (RSRP), reference signal received quality (RSRQ), a carrier-to-interference noise ratio (CINR), a signal-to-noise ratio (SNR), a block error rate (BLER), and the like. For convenience of description, in this embodiment of the present disclosure, only the RSSI is stored at the database.

In the training phase, a database may be generated and stored in a server through wireless infra surveying for an area at which the server wants to provide an LBS, and the like. Generally, wireless infra surveying means collection of data such as received signal strength (RSS) or round trip time (RTT) from multiple access points (APs) at each point or location.

In a non-parametric system, the database includes measurements of a received signal at each point in general. In a parametric system, the database consists of parameters which relate to one or more characteristics of each AP which specifies a signal propagation model of wireless system.

For example, in a path loss model based location estimating system, the database of the server may include a location of each AP and various parameters, such as, e.g., α and β from Equation (1) below. The path loss model relies on the characteristic that received signal power decreases according to a transmission distance, and may be expressed as Equation (1):

$$P_R = P_0 - 10\beta \log_{10}\left(\frac{d}{d_0}\right) + X = \alpha - 10\beta \log_{10}(d) + X \quad (1)$$

In Equation (1), $P_R$ is the RSSI of the received signal, d is the distance between the mobile terminal and the AP, X represents the Gaussian noise having an average power of 0, and $P_0$ is the RSSI of the received signal when the distance between the mobile terminal and the AP is $d_0$.

It is only possible to provide an LBS with high accuracy if the distance between the mobile terminal and the APs is maintained within a threshold distance, e.g., meters.

Most processes which occur in the training phase need to be directly performed by a user of a mobile terminal. If the area required to be traversed by the user in order to provide an LBS is too large, much time and much manpower may be consumed. When an LBS is provided in a public interior place, e.g., a department store, a shop, a hospital, and the like, the time and manpower which are consumed in the training phase should be reduced, if possible.

Recently, high-end mobile terminals, such as smart phones, include various sensors, including inertial sensors, such as, e.g., acceleration sensors, angular velocity sensors, magnetic field sensors, and the like.

According to an embodiment of the present disclosure, inertial sensors are used for decreasing the complexity of the training phase.

In this embodiment, a mobile terminal measures an RSSI of a signal received from each AP in a WLAN every scan time, and also measures the number of movement units of the mobile terminal during each scan period using an acceleration sensor included in the mobile terminal while the mobile terminal is moving on a path between two points, a start point and an end point. The movement unit may be the average distance a user traverses in a preset period, similar to representing the stride or step of the user of the mobile terminal. The mobile terminal acquires the location between each scan period based on interpolation.

In a case that a location of a mobile terminal may be acquired using an acceleration sensor, effort that an operator directly collects data at all interested points included in an area at which an LBS is provided may be reduced.

The location of the mobile terminal in each scan time may be represented as Equation (2):

$$\hat{x}(n) = \frac{\text{Step}(n) - \text{Step}(n_{start})}{\text{Step}(n_{end}) - \text{Step}(n_{start})}(x(n_{end}) - x(n_{start})) + x(n_{start}) \quad (2)$$

where x(n) is the location of the mobile, which is recorded by the mobile user at the n-th scan time, and $n_{start} \leq n \leq n_{end}$ is a Wi-Fi scan time index, and Step (n) is the number of movement units made from the 0-th scan time to the n-th scan time, and $\hat{x}(n)$ is the estimated location of the mobile terminal at the nth scan time. Equation (2) is used to estimate the position of the user at the training phase, while Equation (1) is used to estimate the position of the user during LBS, especially at the parametric location estimation scheme.

In Equation (2), the location of the mobile terminal is calculated based on linear interpolation; however, other interpolation methods may be used in accordance with the present disclosure.

Figure 1:
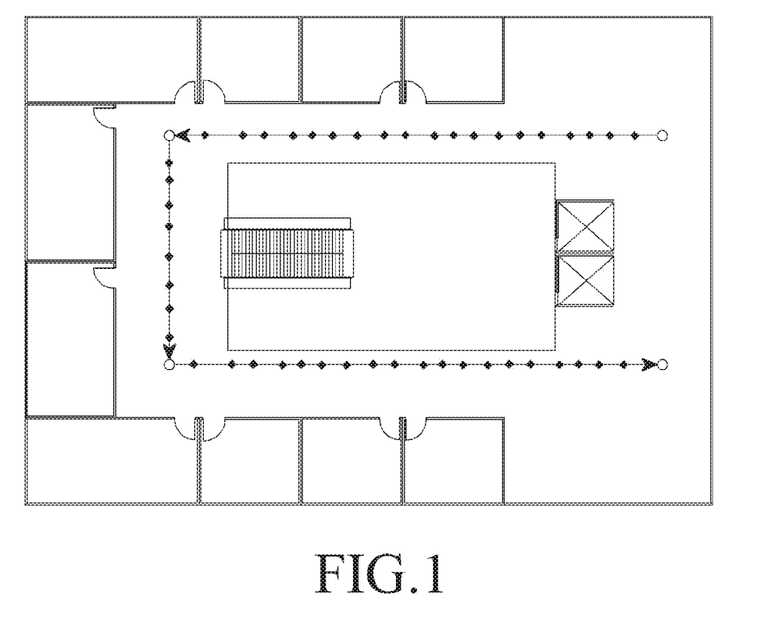
FIG. 1 is a floor diagram which illustrates an example of a training phase for estimating the location of a mobile terminal based on linear interpolation using an acceleration sensor according to an embodiment of the present disclosure.

FIG. 1 is a floor diagram which illustrates an example of a training phase for estimating the location of a mobile terminal based on linear interpolation using an acceleration sensor according to an embodiment of the present disclosure.

In FIG. 1, the circles are where the user of the mobile terminal directly checks the current location on a map. The rhombus-shaped points between the circles are where the mobile terminal estimates the current location based on linear interpolation every scan period. Here, each of the circles means a location recorded by the user of the mobile terminal for a given scan period during the training phase. The training phase will be described below.

Firstly, during the training phase, RSS of all APs at each (grid) point are collected, and a radio map (or database) for localization is constructed thereby having the following form:

Position 1: RSS_1, 1 for *AP*1;

RSS_1, 2 for *AP*2; ... ; RSS_1, *K* for *APK*

:

Position *N*: RSS_N, 1 for *AP*1;

RSS_N, 2 for *AP*2; ... ; RSS_N, *K* for *APK*

Generally, there is a need for recording RSS of APs for all points, e.g., N points in a walkable region. Here, the RSS is automatically recorded every Wi-Fi scan period. During this process, the mobile user needs to record a geographical location of all of the N points. This process is called as a site surveying, and it is performed by a well-trained engineer in general. However, the site-surveying is a very time consuming and labor-intensive job, so there is a need for simplifying this process.

So, instead of recording the location of each point, an embodiment of the present disclosure estimates the location of the user from Equation (1) and constructs a radio map.

When a mobile terminal estimates its location based on linear interpolation every scan period for a WLAN signal, the locations of the plurality of points may be relatively accurately estimated. If the mobile terminal includes an angular velocity sensor as well as an acceleration sensor, the mobile terminal can also sense changes (e.g., turns) in movement direction.

Figure 2:
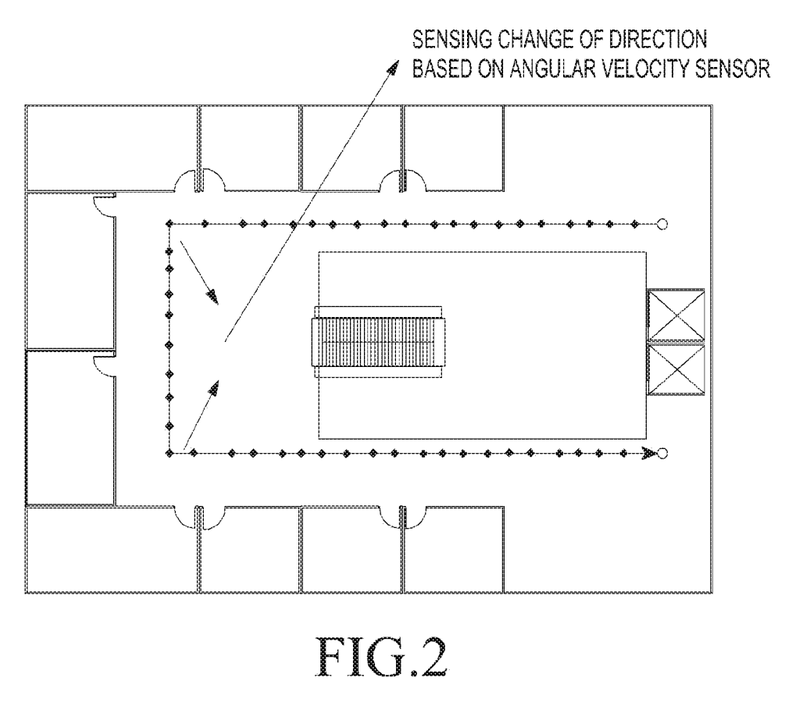
FIG. 2 is a floor diagram which illustrates an example of a training phase for estimating the location of a mobile terminal based on linear interpolation using an acceleration sensor and an angular velocity sensor according to an embodiment of the present disclosure.

FIG. 2 is a floor diagram which illustrates an example of a training phase for estimating the location of a mobile terminal based on linear interpolation using an acceleration sensor and an angular velocity sensor according to an embodiment of the present disclosure.

In FIG. 2, circles are locations where the user of a mobile terminal directly checks the current location on a map. The rhombus-shaped points are locations at which the mobile terminal estimates its location based on linear interpolation every scan time.

As illustrated in FIG. 2, when a mobile terminal estimates its location based on linear interpolation every scan time for a WLAN signal, the locations of a plurality of points may be relatively accurately estimated. Specially, an angular velocity sensor is used as well as the acceleration sensor, the mobile terminal may detect a moving direction while moving.

An embodiment of the present disclosure for decreasing the complexity of the training phase of an interior location estimating scheme in a wireless communication system has been described above, and an embodiment of the present disclosure for enhancing accuracy using an inertial sensor in the refinement phase of the interior location estimating phase is described below.

After the training phase, a server generates a database using measurement values which are collected by the mobile terminal. In a path loss model system, the database includes an identification (ID) and a location for each AP, and various parameters, such as, e.g., α and β in Equation (1) above, based on information for each AP collected in the training phase. The server transmits related information when a request is received from the mobile terminal.

The mobile terminal estimates its current location based on the related information received from the server and signals measured by the mobile terminal.

One embodiment of the present disclosure uses only a measurement value received from an AP. As described above in reference to the embodiment for decreasing the complexity of the training phase, the mobile terminal detects the number of movement units (e.g., strides or steps) of the mobile terminal between one location estimating time and the next location estimating time using an inertial sensor, and increases location estimation accuracy by applying the detected number of movement units to a state transition model.

Assuming the mobile terminal knows the number of movement units per scan period, the state transition model may be expressed as Equation (3):

$$S(n)=x(n),$$

where $x(n)=x(n-1)+(s(n)+k)v(n)$ (3)

In Equation (3), n is the Wi-Fi scan time index, S(n) is a parameter indicating the state in the nth scan time, x(n) is a parameter indicating a location of a mobile terminal, s(n) denotes the number of movement units during a current scan time from a previous scan time, k is a tuned constant to give more randomness to x(n), and v(n) represents the noise/error in the measurements.

If movement unit information, e.g., stride information of a user of the mobile terminal, is known, the state transition model of Equation (3) may be expressed as Equation (4):

$$S(n)=[x(n)\gamma(n)]^T,$$

where $\gamma(n)=\gamma(n-1)+v'(n),$ and $x(n)=x(n-1)+s(n)\gamma(n)$ (4)

where γ(n) denotes stride length in the nth scan period, and v'(n) represents error/noise in stride length.

In an interior location estimating system based on the path loss model, a particle filter algorithm can be applied to above state transition models, e.g., Equation (3) or Equation (4), to estimate the current user position as described in the series of operations [1]-[5] below.

[1] The mobile terminal generates M samples which follow a given probability distribution on an interior map. A state variable for each sample i may be represented by Equation (5), when the movement unit information is not known, and/or Equation (6), when the movement unit information is known:

$$S^i(n)=x^i(n)$$

where $x^i(n)=x^i(n-1)+(s(n)+k)v^i(n)$ (5)

$$S^i(n)=[x^i(n)\gamma^i(n)]^T,$$

where $\gamma^i(n)=\gamma^i(n-1)+v^{ii}(n)$ and $x^i(n)=x^i(n-1)+s(n)\gamma^i(n)$ (6)

Accordingly, each of Equation (5) and Equation (6) denotes a state equation for the ith sample, where i=0, . . . , M.

[2] The mobile terminal updates the probability or, in this case, the weight $w^i(n)$ for each sample i using Equation (7):

$$w^j(n) = \hat{w}^j(n-1) \cdot \exp\left[-\frac{\sum |P_{R,APk} - (\hat{\alpha}_k - 10\hat{\beta}_k \log_{10}|x^i(n) - \hat{x}_{AP,k}|)|^2}{2\sigma^2}\right]$$ (7)

where $P_{R,Apk}$ is the RSSI of the signal received from the kth AP, $\hat{\alpha}_k$ is the estimated α for the kth AP received from a server, $\hat{\beta}_k$ is the estimated β for the kth AP received from the server, $\hat{x}_{AP,k}$ is the estimated location of the kth AP, and n is the Wi-Fi scan time index.

[3] The mobile terminal standardizes the probability or weight for the ith sample as shown in Equation (8).

$$\hat{w}^j(n) = \frac{w^j(n)}{\sum_l w^l(n)}$$ (8)

In Equation (8), $w^i(n)$ denotes the probability or the weight for the ith sample

[4] The mobile terminal calculates its estimated location $\hat{x}_{client}(n)$ using Equation (9):

$$\hat{x}_{client}(n)=\Sigma_i x^i(n)\hat{w}^i(n)$$ (9)

[5] The mobile terminal calculates the effective number of samples $\hat{N}_{eff}$ using Equation (10):

$$\hat{N}_{\mathit{eff}} = \frac{1}{\sum_{i} \hat{w}^{i}(n)} \tag{10}$$

If the effective number of samples $\hat{N}_{\mathit{eff}}$ is less than the preset threshold count $N_{\mathit{thr}}$, the mobile terminal performs the following re-sampling process because the results from Equation (9) will not have the required accuracy.

The mobile terminal regenerates currently generated samples in proportion to a probability or a weight of the currently generated samples. The mobile terminal changes a weight of the regenerated samples to $$\frac{1}{M}.$$

As described above, in an embodiment of the present disclosure, the mobile terminal calculates the distance that the mobile terminal can move every scan time, and applies the calculated distance to an interior location estimating scheme to estimate a location of the mobile terminal.

So, performance of a scheme for estimating a location of a mobile terminal according to an embodiment of the present disclosure may become increased compared to performance of a general interior location estimating scheme which estimates a location of a mobile terminal using only a WLAN signal.

Enhancing accuracy using an inertial sensor in the refinement estimating phase has been described above, and a scheme for enhancing accuracy based on a reliability test for samples in the coarse estimating phase is described below.

When the parametric approach scheme is used and the APs adjacent to a mobile terminal are located relatively evenly around the mobile terminal, the estimated location value has a high accuracy. However, if the APs adjacent to the mobile terminal are located in a specific area or a specific direction in relation to the mobile terminal, the accuracy of the estimated location value for the mobile terminal decreases. This situation where the accuracy for the estimated location decreases frequently occurs at an edge area of an array and/or collection of APs.

Figure 3:
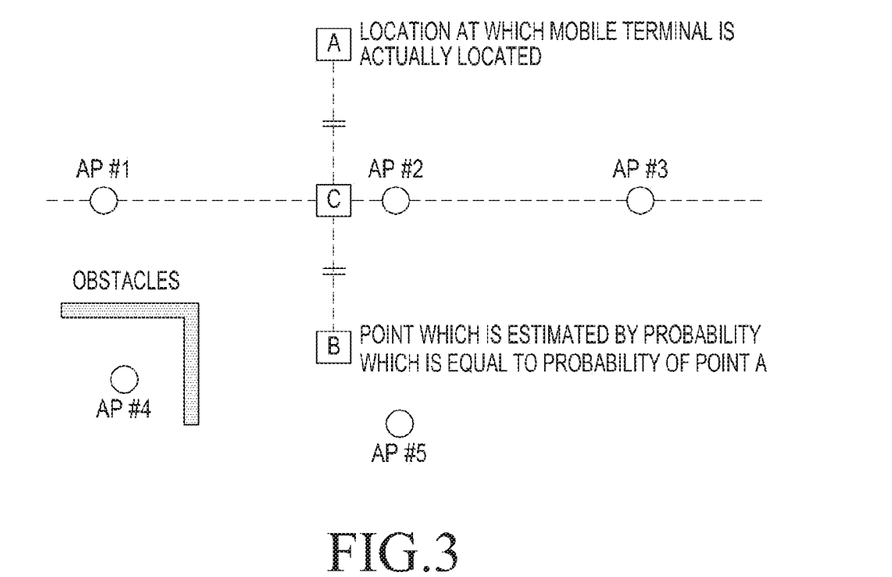
FIG. 3 illustrates an example of how the parametric approach to interior location estimation may result in error.

FIG. 3 illustrates an example of how the location of the mobile terminal is inaccurately estimated using the parametric approach.

In FIG. 3, there are five APs, e.g., AP #1, AP #2, AP #3, AP #4, and AP #5, in an interior environment. Assuming a mobile terminal is located at point A, the mobile terminal may use only the signals received from AP #1, AP #2, and AP #3, because the mobile terminal cannot receive the signal from AP #4 due to obstacles, and the signal from AP #5 is relatively weak since AP #5 is relatively far from the mobile terminal However, as shown in FIG. 3, point A, where the mobile terminal is actually located, is the same distance away from each of AP #1, AP #2, and AP #3 as point B, located on the opposite side from point A. So, the probability that the mobile terminal estimates its location as point A is equal to the probability that the mobile terminal estimates its location as point B.

Figure 4:
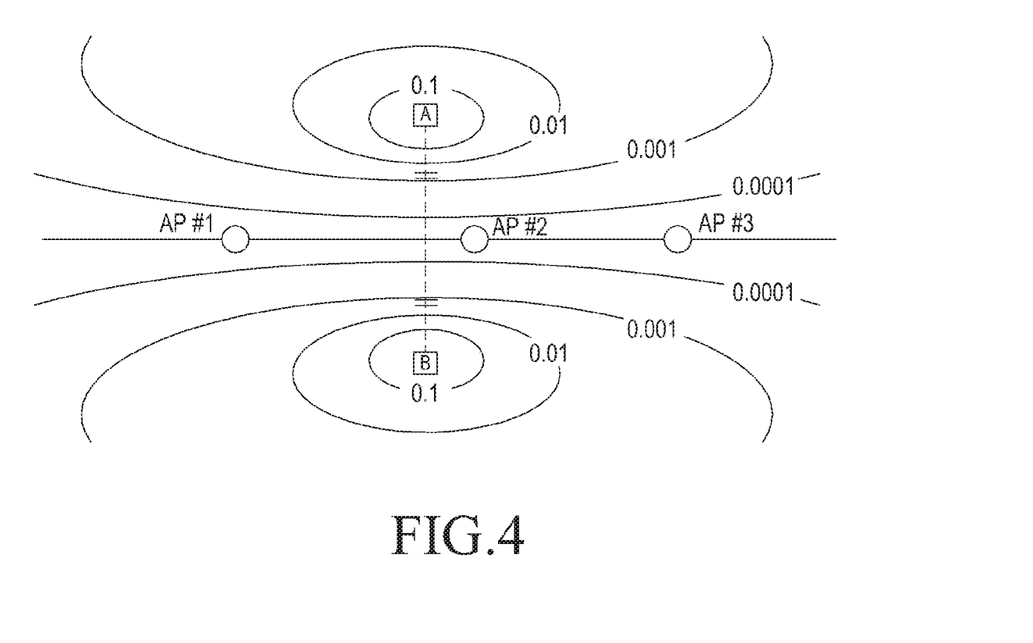
FIG. 4 illustrates the probability distributions for estimated locations of the mobile terminal in the interior environment in FIG. 3.

FIG. 4 illustrates, using contour lines, the probability distributions for estimated locations of the mobile terminal in the interior environment of FIG. 3.

In FIG. 4, point A and point B both have the maximum value of 0.1 for the estimated location of the mobile terminal on the interior map. In this case, the mobile terminal acquires an average value of samples using Equation (9), so the mobile terminal estimates a location of the mobile terminal as a point C or a point adjacent to a point C. According to a situation, distance between the point C or the point adjacent to the point C and a point A at which the mobile terminal is actually located may be very large.

An example of a process for increasing the accuracy of location estimation when there are peak sample values, which process is used during the coarse estimating phase according to an embodiment of the present disclosure, is described below with reference to FIGS. 5 and 6.

Figure 5:
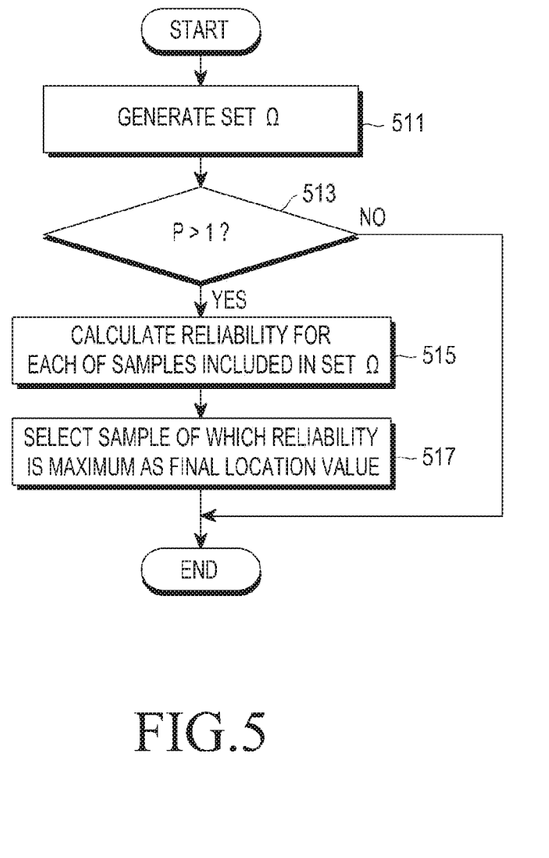
FIG. 5 is a flowchart of an example of a process for increasing the accuracy of location estimation in an environment where there is a plurality of peak sample values according to an embodiment of the present disclosure.

FIG. 5 is a flowchart of an example of a process for increasing accuracy in location estimation in an environment where there is a plurality of peak sample values according to an embodiment of the present disclosure. FIG. 4 above provided an example where there are a plurality of peak sample values.

In step 511, the mobile terminal generates a set $\Omega$ of samples having a peak $\hat{w}(i)$ value compared to surrounding points. In step 513, the mobile terminal determines whether the number P of elements/samples in set $\Omega$ is greater than 1 If the number P of elements is greater than 1, the mobile terminal calculates the reliability of each of the elements/samples included in set $\Omega$ in step 515.

In interior location estimating schemes based on the path loss model, the reliability of the samples included in the $\Omega$ set may be calculated using various reliability schemes, as would be understood by one of ordinary skill in the art. Below, two reliability calculating schemes are described.

Reliability Calculating Scheme #1

For each sample i in the $\Omega$ set ($i \in \Omega$), the mobile terminal searches all APs which satisfy the criterion expressed in Equation (11):

$$|x^{i}(n) - \hat{x}_{AP,k}| < R_{th} \tag{11}$$

where $R_{th}$ is a preset constant.

For each sample i in the $\Omega$ set ($i \in \Omega$), the mobile terminal searches all APs which satisfy the criterion expressed in Equation (12):

$$|\hat{\alpha}_{k} - 10\, \hat{\beta}_{k} \log_{10}|x^{i}(n) - \hat{x}_{AP,k}| P_{R,APk}| < \sigma_{th} \tag{12}$$

where $\sigma_{th}$ is a preset constant related to standard deviation.

The mobile terminal calculates the reliability of the samples included in the set $\Omega$ by using Equation (13):

$$\lambda^{i}(n) = \frac{N_{num}^{i}(n)}{N_{denom}^{i}(n)} \tag{13}$$

where $N_{num}^{i}(n)$ is the number of APs which satisfy Equation (12) and $N_{denom}^{i}(n)$ is the number of APs which satisfy Equation (11).

Reliability Calculating Scheme #2

For each sample i in the $\Omega$ set ($i \in \Omega$), the mobile terminal calculates $e_{sum}^{i}(n)$ using Equation (14):

$$e_{sum}^{i}(n) = \Sigma_{k} |\hat{\alpha}_{k} - 10\, \hat{\beta}_{k} \log_{10}|x^{i}(n) - \hat{x}_{AP,k}| P_{R,APk}| \tag{14}$$

Using $e_{sum}^{i}(n)$, the mobile terminal calculates the reliability of each sample included in the set $\Omega$ using Equation (15):

$$\lambda^{i}(n) = \frac{1}{e_{sum}^{i}(n)} \tag{15}$$

where $\lambda^i(n)$ is the reliability of sample i.

In the reliability calculating scheme #1 and the reliability calculating scheme #2, n is the Wi-Fi scan time index.

Once the reliability test is performed in step 515, the mobile terminal next selects the sample with the maximum reliability among the samples in set $\Omega$, and that sample is set/determined as the final location value of the mobile terminal in step 517.

FIG. 5 illustrates only an example of a process for increasing accuracy in the coarse estimating phase of location estimation in an interior environment where there are a plurality of peak sample values according to an embodiment of the present disclosure. For example, although shown as a series of steps, the various steps in FIG. 5 could overlap, occur in parallel, occur in a different order, or occur multiple times. Moreover, steps may be combined together or further divided into sub-steps, as would be understood by one of ordinary skill in the art.

Because it may be inefficient for the mobile terminal to determine whether there are a plurality of peak values every scan time, in other embodiments of the present disclosure, the mobile terminal may only perform the process in FIG. 5 every N scan time instead of every scan period. Here, N may be a preset or adaptive value.

Figure 6:
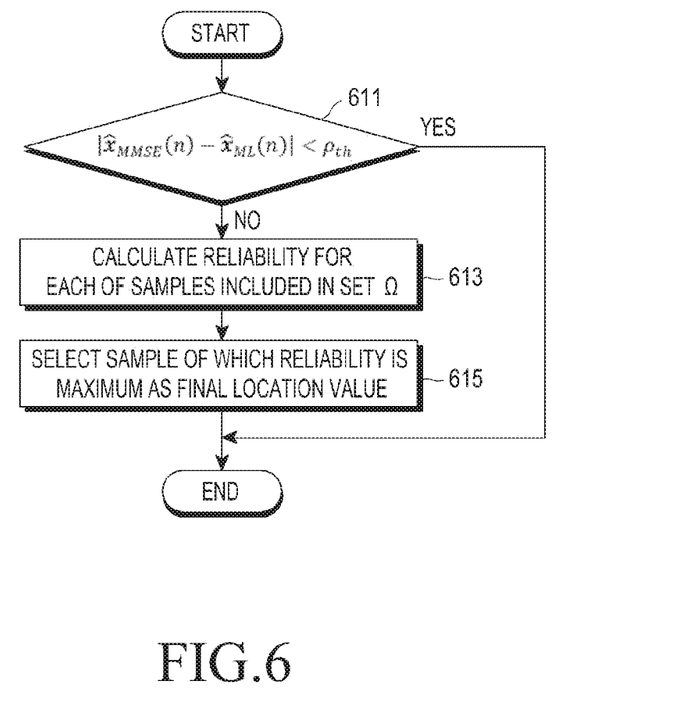
FIG. 6 is a flowchart of another example of a process for increasing the accuracy of location estimation in an environment where there is a plurality of peak sample values according to an embodiment of the present disclosure.

FIG. 6 is a flowchart of another example of a process for increasing location estimation accuracy during the coarse estimating phase when there are a plurality of peak sample values according to an embodiment of the present disclosure. The process for increasing location estimation accuracy in FIG. 6 decreases the amount of calculation compared to the process in FIG. 5.

In step 611, the mobile terminal determines whether $|\hat{x}_{MMSE}(n)-\hat{x}_{ML}(n)|$ is less than $\rho_{th}$ (i.e., $|\hat{x}_{MMSE}(n)-\hat{x}_{ML}(n)|<\rho_{th}$) where $\hat{x}_{MMSE}(n)$ is the location of the mobile terminal estimated using a minimum mean squared error (MMSE) scheme, $\hat{x}_{ML}(n)$ is the location of the mobile terminal estimated using a maximum likelihood (ML) scheme, and $\rho_{th}$ is a predetermined constant value.

The estimated location $\hat{x}_{MMSE}(n)$ of the mobile terminal based on MMSE may be calculated using Equation (16):

$$\hat{x}_{MMSE}(n) = \Sigma_i x^i(n) w^i(n) \quad (16)$$

The estimated location $\hat{x}_{ML}(n)$ of the mobile terminal based on ML may be calculated using Equation (17):

$$\hat{x}_{ML}(n) = x^{\hat{i}}(n), \text{ where} \quad (17)$$
$$\hat{i} = \underset{i}{\operatorname{argmax}} w^i(n)$$

If $|\hat{x}_{MMSE}(n)-\hat{x}_{ML}(n)|$ is not less than $\rho_{th}$, that is, if $|\hat{x}_{MMSE}(n)-\hat{x}_{ML}(n)|$ is greater than or equal to $\rho_{th}$ at step 611, the mobile terminal calculates the reliability of each of the elements, i.e., samples, included in set $\Omega$ in step 613. Two examples for calculating the reliability of each of the samples in set $\Omega$ are described above in reference to FIG. 5, so a detailed description will be omitted herein.

In step 615, the mobile terminal selects the sample with the maximum reliability from among the samples/elements included in set $\Omega$ as the final location value of the mobile terminal.

FIG. 6 illustrates only another example of a process for increasing accuracy in the coarse estimating phase of location estimation where there are a plurality of peak sample values according to an embodiment of the present disclosure. As would be understood by one of ordinary skill in the art, various changes could be made to FIG. 6. For example, although shown as a series of steps, the various steps in FIG. 6 could overlap, occur in parallel, occur in a different order, or occur multiple times. Moreover, steps may be combined together or further divided into sub-steps.

According to various embodiments of the present disclosure, the process for calculating the reliability of each sample and increasing the location estimation accuracy may be applied to a path loss model-based location estimating system which uses the round trip time (RTT) between the mobile terminal and an AP.

In a path loss model-based location estimating system using RTT, Equation (7) may be changed to Equation (18):

$$w^j(n) = w^j(n-1) \cdot \exp\left[-\frac{\sum |T_{R,APk} - \hat{T}^j_{R,APk}|^2}{2\sigma^2}\right] \quad (18)$$

where $T_{R,APk}$ is the RTT value or distance between AP #k and the mobile terminal, and $\hat{T}_{R,APk}$ is the RTT value or distance between a sample i which is calculated from a signal model and AP #k.

Figure 7:
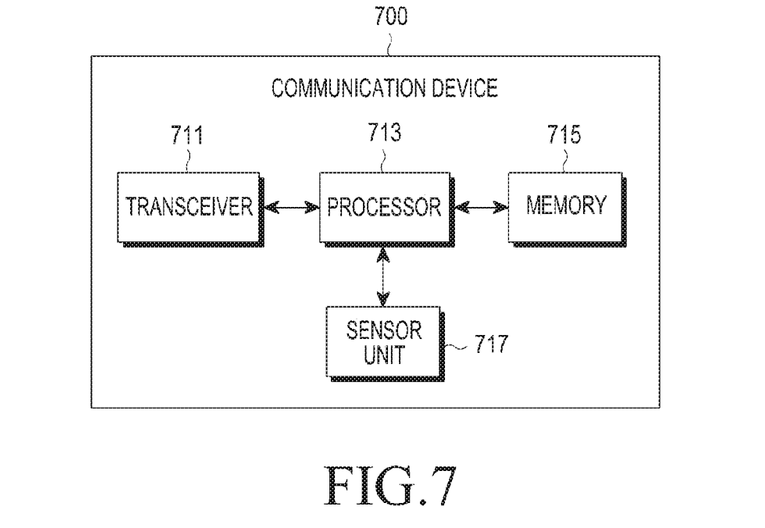
FIG. 7 illustrates an example of the inner structure of a communication device in a wireless communication system according to various embodiments of the present disclosure.

FIG. 7 illustrates an example of the inner structure of a communication device in a wireless communication system according to various embodiments of the present disclosure.

In FIG. 7, communication device 700 according to various embodiments of the present disclosure includes transceiver 711, processor 713, memory 715, and sensor unit 717.

The transceiver 711 performs communication operations among the communication device 700 and external devices, such as, e.g., another mobile terminal, an AP, and the like. Terms such as "transceiver", "communication module" and "communication interface" may be interchangeably used. The transceiver 711 performs communication operations based on various long-range, short-range, wired, and/or wireless communication schemes.

For example, transceiver 711 may perform wireless communication using a cellular communication scheme, such as, e.g., an LTE scheme, an LTE-A scheme, a CDMA scheme, a WCDMA scheme, a universal mobile telecommunications system (UMTS) scheme, a wireless broadband (WiBro) scheme, a global system for mobile communications (GSM) scheme, and the like. The transceiver 711 may perform short-range communication using a scheme such as, e.g., a wireless fidelity (Wi-Fi) scheme, a Bluetooth© scheme, and/or a near field communication (NFC) scheme. Transceiver 711 may perform navigational communication operations using schemes such as, e.g., a global navigation satellite system (GNSS), and the like. Here, the GNSS scheme may include at least one of a GPS, the Russian global navigation satellite system (GLONASS), the Chinese navigation satellite system (Beidou), and the European global satellite-based navigation system (Galileo) according to a use area, a bandwidth, and/or the like. For convenience, the terms such as "GPS" and "GNSS" may be interchangeably used.

The transceiver 711 may perform wired communications, using schemes that may include at least one of a universal serial bus (USB) scheme, a high definition multimedia interface (HDMI) scheme, a recommended standard 232 (RS-232) scheme, a plain old telephone service (POTS) scheme, and the like.

The transceiver 711 transmits and receives various signals and various messages related to an inner/interior location estimating scheme according to various embodiments of the present disclosure, i.e., such as the various signals and various messages described in reference to FIGS. 1 to 6, and further description thereof is omitted herein.

The processor 713 may include a communication processor (CP). According to various embodiments of the present disclosure, the processor 713 may include at least one of a central processing unit (CPU) and an application processor (AP). The processor 713 may perform an operation related to calculation or data processing related to a control and/or a communication of at least one other unit included in the communication device 700. According to various embodiments of the present disclosure, the terms such as "processor", "control module", "control unit", and "controller" may be interchangeably used depending on the context and implementation.

The processor 713 controls operations related to inner/interior location estimating schemes according to various embodiments of the present disclosure, as described in reference to FIGS. 1 to 6, and further description thereof is omitted herein.

The memory 715 may include a volatile memory and/or a non-volatile memory. For example, the memory 715 may store a command or data related to at least one other unit included in the communication device 700. According to various embodiments of the present disclosure, the memory 715 may store software and/or one or more programs. In some embodiments, the program may include a kernel, a middleware, an application programming interface (API) and/or an application program (or an application), and the like. In FIG. 7, the memory 715 is included in the communication device 700; however, the communication device 700 does not have to include memory 715, and memory 715 in terms of the functions according to the present disclosure may be external to device 700.

The memory 715 stores various programs, data, databases, and the like related to operations related to inner/interior location estimating schemes according to various embodiments of the present disclosure, as described in reference to FIGS. 1 to 6, and further description thereof is omitted herein.

The sensor unit 717 may include an inertial sensor, which may be an acceleration sensor, an angular velocity sensor, a magnetic field sensor, and the like. Sensor information which is sensed in the sensor unit 717 is transferred to the processor 713, and the processor 713 performs operations based on the sensor information which is transferred from the sensor unit 717, including operations related to inner/interior location estimating schemes according to various embodiments of the present disclosure.

While the transceiver 711, the processor 713, the memory 715, and the sensor unit 717 are described in the communication device 700 as separate units, it is to be understood that this is merely for convenience of description. In other words, two or more of the transceiver 711, the processor 713, the memory 715, and the sensor unit 717 may be incorporated into a single unit. The communication device 700 may be implemented with one processor.

Figure 8:
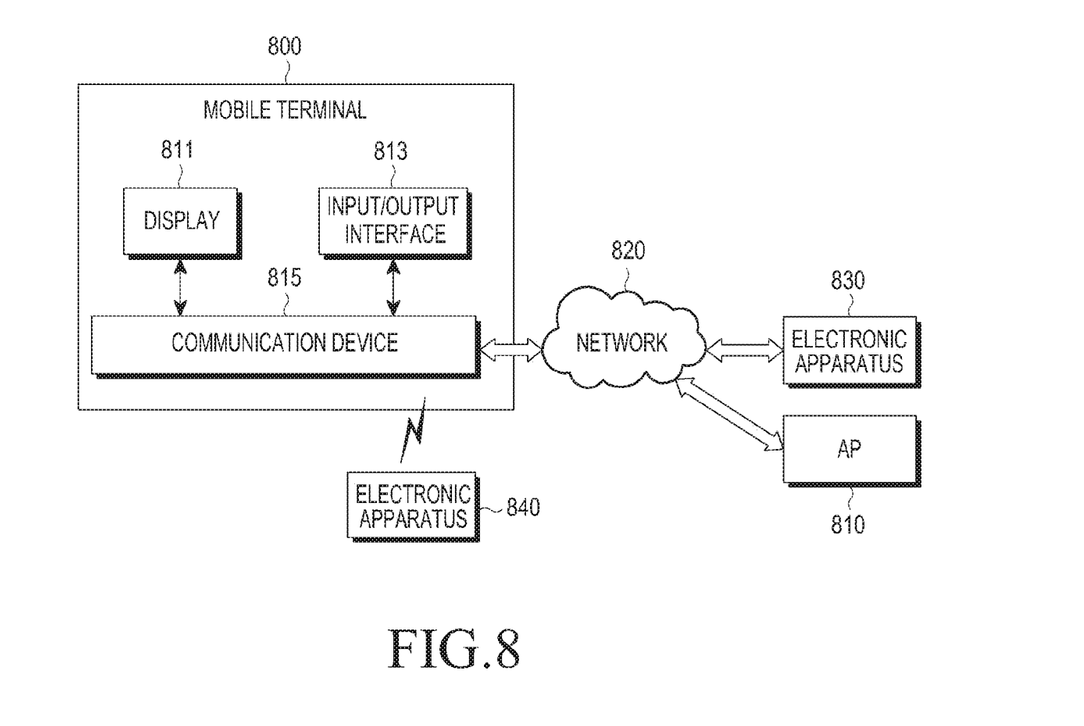
FIG. 8 illustrates an example of the inner structure of a mobile terminal according to various embodiments of the present disclosure.

FIG. 8 illustrates an example of the inner structure of a mobile terminal according to various embodiments of the present disclosure. In FIG. 8, mobile terminal 800 according to various embodiments of the present disclosure includes a communication device 815, a display 811, and an input/output interface 813.

Communication device 815 may communicate with external electronic apparatuses, e.g., electronic apparatuses 830 and 840, and AP 810. Communication device 815 is similar to the communication device 700 described in FIG. 7 and further description is omitted herein.

The display 811 may be implemented in various forms, e.g., a liquid crystal display (LCD), a light-emitting diode (LED) display, an organic light-emitting diode (OLED) display, a microelectromechanical systems (MEMS) display, an electronic paper display, and the like. The display 811 may display various contents, e.g., a text, an image, a video, an icon, a symbol, and the like. The display 811 may include a touch screen, and receive a touch, a gesture, an approach, or a hovering input.

The input/output interface 813 may perform a role of an interface which transfers an input command or data to other units included in the mobile terminal 800. The input/output interface 813 may output a user command or data received from the other units included in the mobile terminal 800.

According to various embodiments of the present disclosure, the mobile terminal 800 may further include a storage module, e.g., a memory, and the like, or a processor, e.g., an AP, and the like. While the communication device 815, the display 811, and the input/output interface 813 are described in the mobile terminal 800 as separate units, it is to be understood that this is merely for convenience of description. In other words, two or more of the communication device 700, the display 811, and the input/output interface 813 may be incorporated into a single unit. The mobile terminal 800 may be implemented with one processor.

Figure 9:
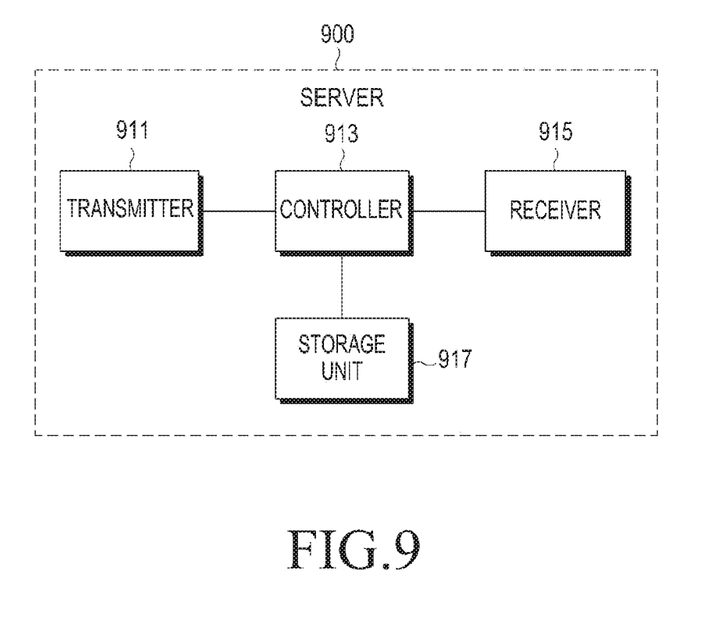
FIG. 9 illustrates an example of the inner structure of a server in a wireless communication system according to various embodiments of the present disclosure.

FIG. 9 illustrates an example of the inner structure of a server in a wireless communication system according to various embodiments of the present disclosure. In FIG. 9, server 900 includes transmitter 911, controller 913, receiver 915, and storage unit 917.

The controller 913 controls the overall operation of the server 900, including controlling the server 900 to perform operations related to an interior location estimating schemes according to various embodiments of the present disclosure, such as described with reference to FIGS. 1 to 6, and further description thereof is omitted herein.

The transmitter 911 transmits various signals and various messages, and the like to other entities, e.g., a communication device, and the like under a control of the controller 913. The various signals, the various messages, and the like related to the various embodiments of interior location estimation according to various embodiments of the present disclosure that may be transmitted in the transmitter 911 have been described in reference to FIGS. 1 to 6 and further description thereof is omitted herein.

The receiver 915 receives various signals, various messages, and the like from other entities, which may or may not be under the control of the controller 913. The various signals, the various messages, and the like related to the various embodiments of interior location estimation according to various embodiments of the present disclosure that may be received in the receiver 915 have been described in reference to FIGS. 1 to 6 and further description thereof is omitted herein.

The storage unit 917 stores programs, data, and the like, which may include one or more programs related to inner/interior location estimating schemes according to various embodiments of the present disclosure which the server 900 performs under a control of the controller 913. The storage unit 917 may store various signals and the various messages which the receiver 915 receives from the other entities, and the like.

While the transmitter 911, the controller 913, the receiver 915, and the storage unit 917 are described in the server 900 as separate units, it is to be understood that this is merely for convenience of description. In other words, two or more of the transmitter 911, the controller 913, the receiver 915, and the storage unit 917 may be incorporated into a single unit. The server 900 may be implemented with one processor.

As is apparent from the foregoing description, an embodiment of the present disclosure enables a mobile terminal to estimate a location in a wireless communication system. Embodiments of the present disclosure may increase the accuracy of location estimation in a wireless communication system, increase the accuracy of estimating a location of a mobile terminal by selecting a plurality of candidate locations of the mobile terminal based on a reliability test in a wireless communication system, and/or increase the accuracy of estimating a location of a mobile terminal by restricting the movable distance from the previous location of the mobile terminal in a wireless communication system.

Embodiments of the present disclosure enable location estimation based on sensor information in a preset period in a wireless communication system.

Embodiments of the present disclosure may increase accuracy in location estimation in a wireless communication system, decrease complexity in a wireless communication system, enhance reliability in a wireless communication system, and/or decrease the time required for estimating the location in a wireless communication system.

Certain aspects of the present disclosure may be embodied as computer readable code stored on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented at least partially by hardware, software and/or a combination thereof, including, but not limited to, a broadband modem chip. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct the apparatus to perform tasks, functions, methods, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made without departing from the spirit and scope of the present disclosure as defined by the appended claims and their equivalents.

What is claimed is:

1. A method for increasing location estimation accuracy of a communication device, the method comprising:
   identifying a set including at least one sample among a plurality of samples of a probability distribution for estimated locations of the communication device; and
   determining a location of the communication device among the at least one sample based on a reliability of each of the at least one sample,
   wherein the determining comprises:
   when a difference between a first location of the communication device which is estimated based on a first scheme and a second location of the communication device which is estimated based on a second scheme is greater than or equal to a preset threshold value, determining the reliability of each of the at least one sample in the set; and
   determining a sample of which a reliability is greatest among the at least one sample as the location of the communication device.

2. The method of claim 1,
   wherein the at least one sample has a peak probability value compared to other samples in the plurality of samples.

3. The method of claim 1,
   wherein the first scheme includes a minimum mean squared error scheme.

4. The method of claim 1,
   wherein the second scheme includes a maximum likelihood scheme.

5. The method of claim 1,
   wherein determining the location of the communication device based on the reliability of each of the at least one sample comprises determining the reliability of each of the at least one sample included in the set when a number of samples included in the set is two or more.

6. The method of claim 5,
   wherein determining the location of the communication device based on the reliability of each of the at least one sample further comprises determining a sample of which a reliability is greatest among the at least one sample as the location of the communication device.

7. A communication device for increasing location estimation accuracy of the communication device, comprising:
   at least one processor configured to:

identify a set including at least one sample among a plurality of samples of a probability distribution for estimated locations of the communication device; and determine a location of the communication device among the at least one sample based on a reliability of each of the at least one sample, wherein determining the location comprises:

when a difference between a first location of the communication device which is estimated based on a first scheme and a second location of the communication device which is estimated based on a second scheme is greater than or equal to a preset threshold value, determine the reliability of each of the at least one sample in the set; and determine a sample of which a reliability is greatest among the at least one sample as the location of the communication device.

8. The communication device of claim 7, wherein the at least one sample has a peak probability value compared to other samples in the plurality of samples.

9. The communication device of claim 7, wherein the first scheme includes a minimum mean squared error scheme.

10. The communication device of claim 7, wherein the second scheme includes a maximum likelihood scheme.

11. The communication device of claim 7, wherein the at least one processor is further configured to determine the reliability of each of the at least one sample included in the set when a number of samples included in the set is two or more.

12. The communication device of claim 11, wherein the at least one processor is further configured to determine a sample of which a reliability is greatest among the at least one sample as the location of the communication device.

13. The communication device of claim 7, further comprising:

an inertial sensor, wherein the inertial sensor is used to detect a number of movement units.

14. The communication device of claim 13, wherein the inertial sensor comprises at least one of an acceleration sensor, an angular velocity sensor, and a magnetic field sensor.

15. A non-transitory computer-readable medium, wherein at least one processor, when executing instructions stored on the non-transitory computer-readable medium, performs a method comprising:

identifying a set including at least one sample among a plurality of samples of a probability distribution for estimated locations of the communication device; and determining a location of the communication device among the at least one sample based on a reliability of each of the at least one sample, wherein the determining comprises:

when a difference between a first location of the communication device which is estimated based on a first scheme and a second location of the communication device which is estimated based on a second scheme is greater than or equal to a preset threshold value, determining the reliability of each of the at least one sample in the set; and determining a sample of which a reliability is greatest among the at least one sample as the location of the communication device.

16. The non-transitory computer-readable medium of claim 15, wherein the at least one sample has a peak probability value compared to other samples in the plurality of samples.

17. The non-transitory computer-readable medium of claim 15, wherein the first scheme includes a minimum mean squared error scheme.

18. The non-transitory computer-readable medium of claim 15, wherein the second scheme includes a maximum likelihood scheme.

19. The non-transitory computer-readable medium of claim 15, wherein determining the location of the communication device based on the reliability of each of the at least one sample comprises determining the reliability of each of the at least one sample included in the set when a number of samples included in the set is two or more.

20. The non-transitory computer-readable medium of claim 19, wherein determining the location of the communication device based on the reliability of each of the at least one sample comprises determining a sample of which a reliability is greatest among the at least one sample as the location of the communication device.

* * * * *